United States Patent
Pounds

(10) Patent No.: US 7,944,691 B1
(45) Date of Patent: May 17, 2011

(54) SHOCK AND VIBRATION PROOF LOCKING HANDLE AND PAWL ASSEMBLY

(75) Inventor: William E. Pounds, Colorado Springs, CO (US)

(73) Assignee: Astek Corporation, Colorado Springs, CO (US)

( * ) Notice: Subject to any disclaimer, the term of this patent is extended or adjusted under 35 U.S.C. 154(b) by 75 days.

(21) Appl. No.: 12/583,529

(22) Filed: Aug. 24, 2009

(51) Int. Cl.
*G06F 1/16* (2006.01)
(52) U.S. Cl. .............................. 361/679.59; 361/679.37
(58) Field of Classification Search ............. 361/679.34, 361/679.37, 679.58, 679.59
See application file for complete search history.

(56) References Cited

U.S. PATENT DOCUMENTS

| | | | | |
|---|---|---|---|---|
| 4,982,303 | A * | 1/1991 | Krenz ...................... | 361/679.37 |
| 5,673,171 | A * | 9/1997 | Varghese et al. .......... | 361/679.58 |
| 6,483,107 | B1 * | 11/2002 | Rabinovitz et al. ....... | 361/679.58 |
| 6,487,071 | B1 * | 11/2002 | Tata et al. ................. | 361/679.34 |
| 6,498,723 | B1 * | 12/2002 | Konshak et al. ......... | 361/679.34 |
| 6,918,174 | B2 * | 7/2005 | Kim et al. ................. | 361/679.37 |
| 7,477,511 | B2 * | 1/2009 | Hsu et al. ................. | 361/679.37 |
| 7,518,854 | B2 * | 4/2009 | Salinas et al. ............ | 361/679.37 |
| 7,609,511 | B2 * | 10/2009 | Peng et al. ................ | 361/679.37 |
| 7,701,707 | B2 * | 4/2010 | Peng et al. ................ | 361/679.37 |
| 7,715,185 | B2 * | 5/2010 | Zhang et al. .............. | 361/679.37 |
| 7,782,606 | B2 * | 8/2010 | Baker et al. ............... | 361/679.39 |
| 7,808,777 | B2 * | 10/2010 | Luo ........................... | 361/679.37 |
| 7,848,096 | B2 * | 12/2010 | Peng et al. ................ | 361/679.33 |
| 2002/0079423 | A1 * | 6/2002 | Jiang .......................... | 361/685 |
| 2003/0206402 | A1 * | 11/2003 | Tsuyuki et al. ............. | 361/685 |
| 2004/0150947 | A1 * | 8/2004 | Tang .......................... | 361/685 |
| 2006/0067042 | A1 * | 3/2006 | Salinas et al. .............. | 361/685 |
| 2006/0232923 | A1 * | 10/2006 | Liang ......................... | 361/685 |
| 2007/0064385 | A1 * | 3/2007 | Paul et al. .................. | 361/685 |
| 2007/0127202 | A1 * | 6/2007 | Scicluna et al. ............ | 361/685 |
| 2007/0159786 | A1 * | 7/2007 | Liu et al. .................... | 361/685 |
| 2007/0211422 | A1 * | 9/2007 | Liu et al. .................... | 361/685 |
| 2008/0204994 | A1 * | 8/2008 | Wang ......................... | 361/685 |
| 2009/0262498 | A1 * | 10/2009 | Chen et al. ............... | 361/679.58 |
| 2009/0279249 | A1 * | 11/2009 | Crippen et al. .......... | 361/679.58 |
| 2010/0284145 | A1 * | 11/2010 | Kang ....................... | 361/679.58 |

* cited by examiner

*Primary Examiner* — Lisa Lea-Edmonds
(74) *Attorney, Agent, or Firm* — Edwin H. Crabtree; Ramon L. Pizarro

(57) ABSTRACT

A locking handle and pawl assembly mounted on a removable memory cartridge or RMC and adapted for releasable attachment to a removable memory cartridge bay or RMC bay. The assembly includes a handle with handle base and handle arm extending outwardly therefrom. The handle base includes pin holes and a handle dwell slot. The handle base is pinned to one or two locking members called pawls and pinned between a pair of outwardly extending RMC enclosure brackets on an RMC enclosure or housing. When the handle arm is rotated upwardly, an RMC Bay catch on a cam surface of the pawl(s) is released from a side of a catch opening in the top of the RMC Bay. The upwardly rotation of the handle leverages another feature of the handle called the handle nose against another side of the RMC Bay causing linear movement of the RMC relative to the RMC Bay which disengages the male connector on the RMC's hard disk drive from the female connector on the RMC Bay's printed circuit board allowing for easier removal of the RMC from the RMC Bay while only holding the handle arm with one hand.

17 Claims, 3 Drawing Sheets

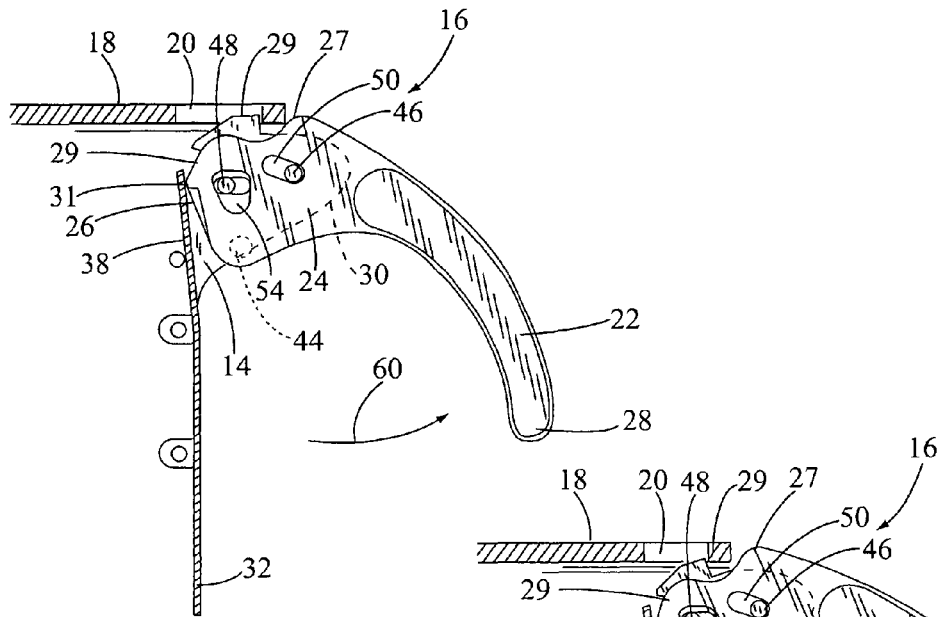
FIG. 5
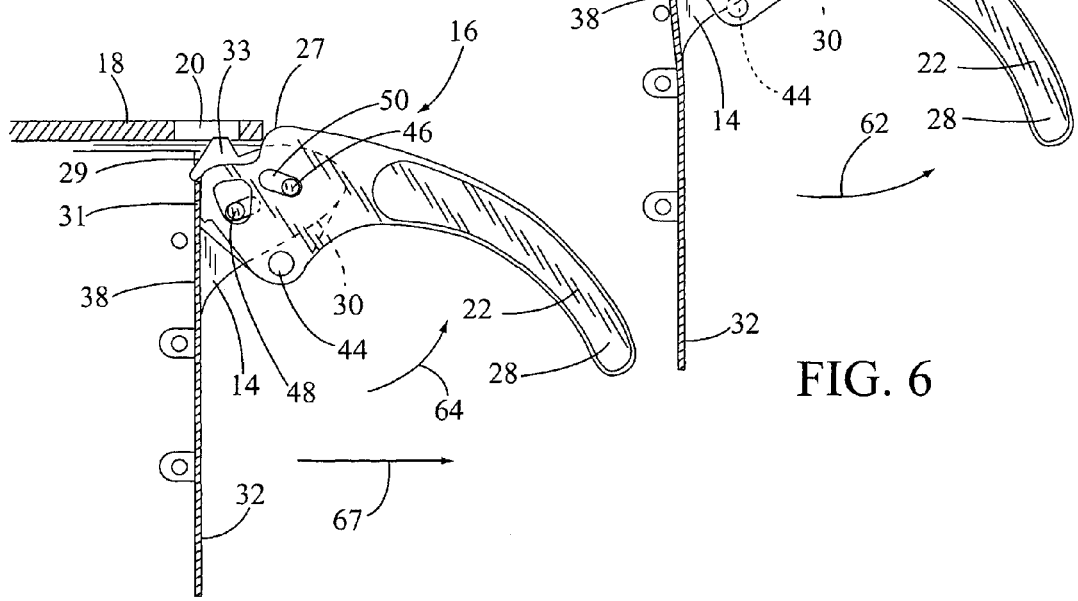
FIG. 6
FIG. 7

SHOCK AND VIBRATION PROOF LOCKING HANDLE AND PAWL ASSEMBLY

BACKGROUND OF THE INVENTION (a) Field of the Invention

This invention relates to a locking assembly used with the storage of portable hard disk drive units and more particularly, but not by way of limitation, a shock and vibration proof locking handle and pawl assembly. A locking handle and pawl assembly is used for securing and removing a removable memory cartridge or RMC, with a computer hard disk drive stored therein. An RMC is disposed inside a removable memory cartridge bay or RMC Bay. The RMC Bay includes a printed circuit board with a female connector for connecting to the male connector on the hard disk drive inside the RMC.

(b) Discussion of Prior Art

Heretofore, there have been a number of patented locking mechanisms for hard disk drive storage in computer systems. For example, a locking mechanism for a disk drive carrier is described in U.S. Pat. No. 6,804,111 to Williams et al. Also, a shock dampening system is disclosed for a hard disk carrier in U.S. Pat. No. 6,233,143 to Gamble et al. Further, a latch and locking handle for an electrical connector is described for securing in place a plug-in electrical connector in U.S. Pat. No. 4,969,838 to Himes, Jr. et al.

The above mentioned patents do not disclose, teach, or suggest the unique structural features and function of the subject locking handle and pawl assembly used with an RMC and an RMC Bay as described herein.

SUMMARY OF THE INVENTION

In view of the foregoing, it is a primary objective of the subject invention to provide a locking handle and pawl assembly that prevents displacement of an RMC from an RMC Bay until a user intentionally intervenes by rotating a handle to disengage and remove the RMC from the RMC Bay.

Another object of the invention is the locking handle and pawl assembly provides proper mechanical and electrical relationship during shock loading and vibration between the RMC and an RMC Bay.

The subject invention includes a locking handle and pawl assembly mounted on a removable memory cartridge or RMC and adapted for releasable attachment to a removable memory cartridge bay or RMC Bay. The assembly includes a handle with handle base and handle arm extending outwardly therefrom. The handle base includes pin holes and a handle dwell slot. The handle base is pinned to one or two locking members called pawls and pinned between a pair of outwardly extending RMC enclosure brackets on an RMC enclosure or housing. When the handle arm is rotated upwardly, an RMC Bay catch on a cam surface of the pawl(s) is released from a side of a catch opening in the top of the RMC Bay. The upwardly rotation of the handle leverages another feature of the handle called the handle nose against another side of the RMC Bay causing linear movement of the RMC relative to the RMC Bay which disengages the male connector on the RMC's hard disk drive from the female connector on the RMC Bay's printed circuit board allowing for easier removal of the RMC from the RMC Bay while only holding the handle arm with one hand.

These and other objects of the present invention will become apparent to those familiar with various types of locking mechanisms and shock dampening systems related to hard disk drive carriers when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for its practical application and in which.

Also an RMC front cover plate with the flat spring having a flat spring opening is shown engaging a horizontal side of a flat spring catch on the pawl cam surface of the pawl.

Figure 4:
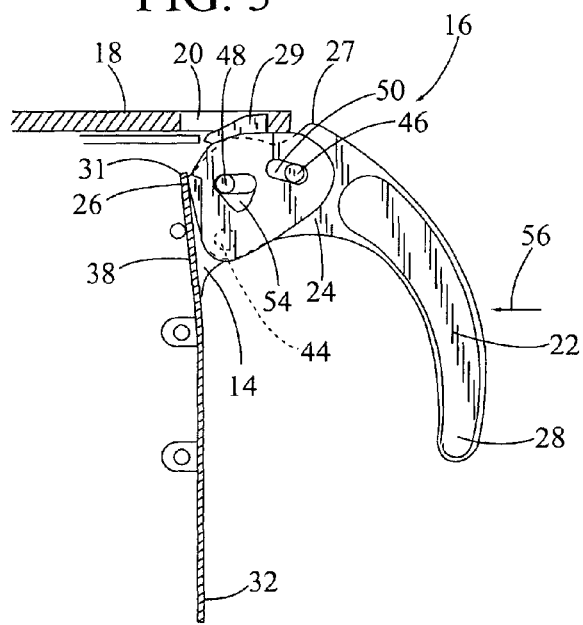

FIG. 4 illustrates the handle arm rotated upwardly and counterclockwise ten degrees with a handle cam surface on the handle base engaging and releasing the flat spring catch on the pawl from the flat spring portion of the RMC front cover plate. During this part of the handle movement a pawl axle pin moves freely within a handle dwell slot on the handle as the handle rotates about handle and pawl attachment pin and a handle motion restrictor pin moves freely within the pawl dwell slot on the Pawl.

FIGS. 5 and 6 illustrate the handle arm moved upwardly twenty and thirty degrees. The pawl axle pin now impacts the end of a handle dwell slot and drives the pawls rotationally counterclockwise about the pawl axle pin which lowers the pawl bay catch on the pawl relative to the inside of the bay catch opening in the RMC Bay.

FIG. 7 illustrates a handle arm rotated upwardly forty degrees fully rotating the pawl counterclockwise 30 degrees and lowering the pawl bay catch from the inside surface of the bay catch opening. A handle motion restrictor cutout in the pair of RMC enclosure brackets prevents further motion of the handle arm by impeding the motion of the handle motion restrictor pin which is fixed to the handle base. The RMC can now easily be removed from the RMC Bay.

DETAILED DESCRIPTION OF THE PREFERRED EMBODIMENTS

Figure 1:
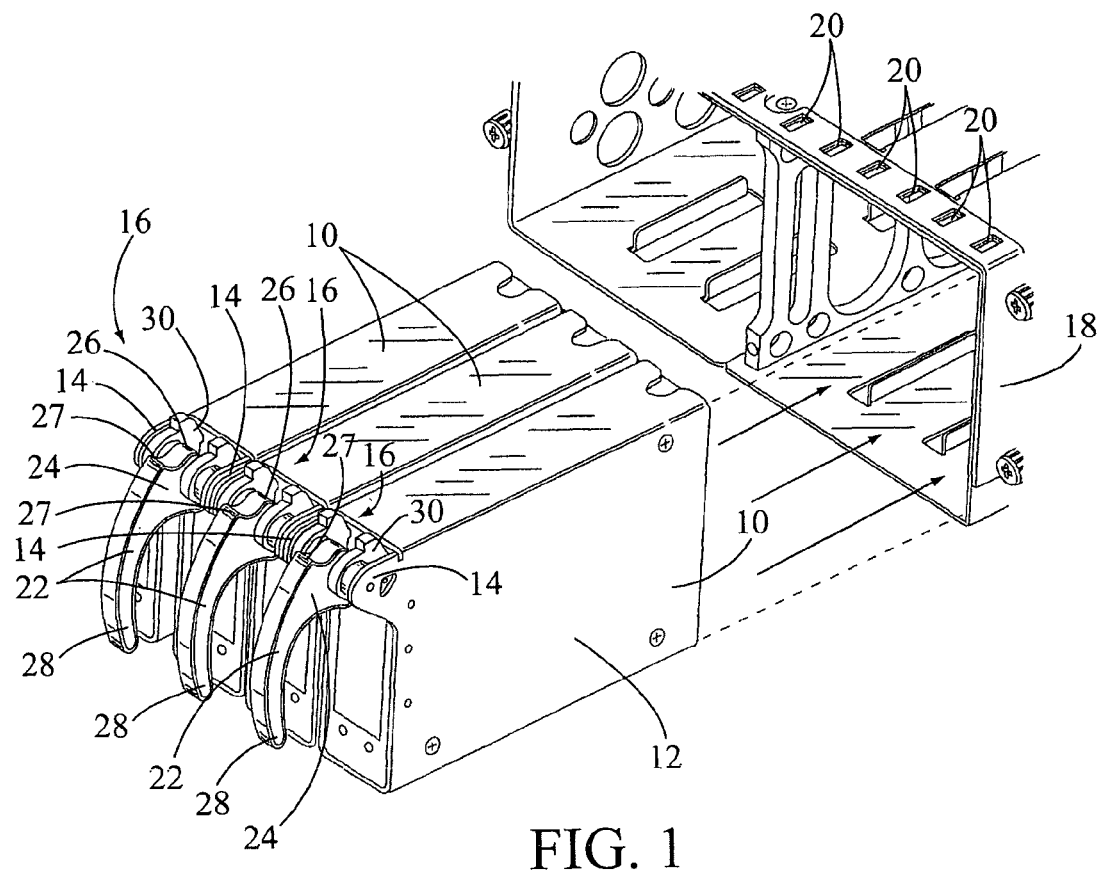
FIG. 1 is a perspective view of three RMC's with the subject locking handle and pawl assembly mounted on each RMC and positioned for receipt inside an RMC Bay to be secured therein.

In FIG. 1, a perspective view is shown of three removable memory cartridges or RMC's 10 having an RMC enclosure 12 and a pair of outwardly extending RMC enclosure brackets 14. The RMC enclosure brackets 14 are used for mounting the subject locking handle and pawl assembly 16. The RMC's 10 with locking handle and pawl assembly 16 are shown positioned for receipt inside a removable memory cartridge bay or RMC Bay 18. The top of an RMC Bay 18 is shown having a plurality of bay catch openings 20.

The locking handle and pawl assembly 16 is shown broadly having a handle 22. The handle 22 includes a handle base 24 with a handle cam surface 26 on one side and on the other side an outwardly extending handle arm 28. Referring now to both FIGS. 1 and 2, the handle arm 28, when rotated counterclockwise, as shown in FIGS. 3-7, is used to move a portion of the flat spring 38 of a RMC front cover plate 32 from it's initial resting position against the flat spring catch 31 which then allows a pawl 30 to rotate to a position where a pawl bay catch 33 on the pawl 30 no longer interferes with the bay catch opening 20 on the RMC Bay 18 and allows the removal of the RMC 10 from the RMC Bay 18. Also shown in FIG. 1 is a portion of two pawls 30 pinned on opposite sides of the handle base 24 and pinned to the inside surfaces of the RMC enclosure brackets 14.

Figure 2:
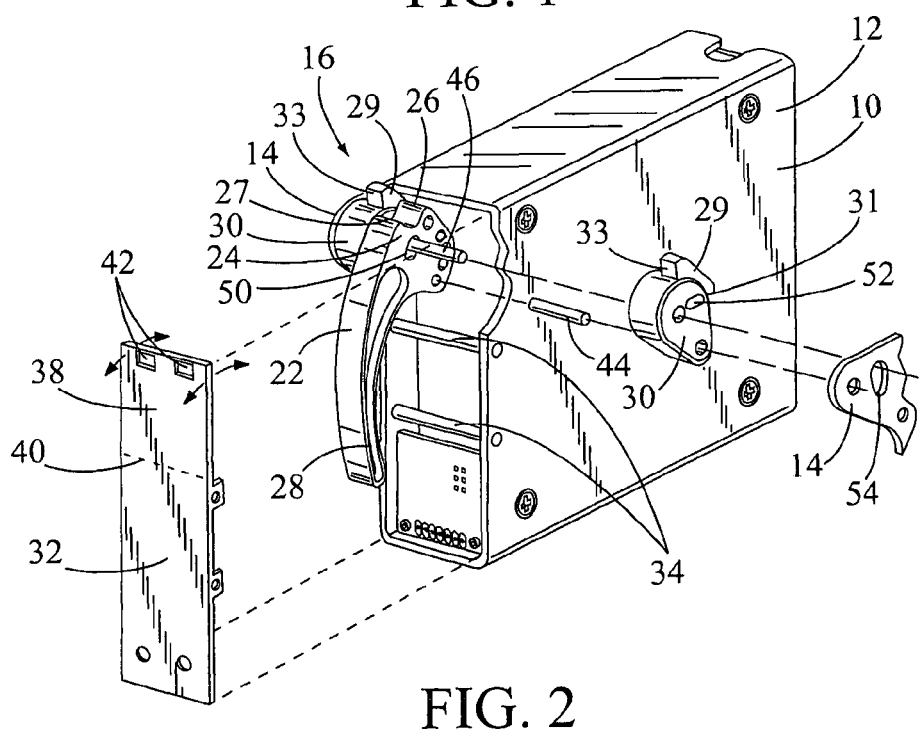
FIG. 2 is a perspective view of an RMC with an exploded view of the locking handle and pawl assembly and positioned for being pinned between the inside surfaces of a pair of RMC enclosure brackets extending outwardly from the RMC enclosure. Also, a RMC front cover plate, which the upper portion is used as a flat spring, is shown positioned for being pinned to the front of the RMC enclosure.

It should be mentioned that FIGS. 1 and 2 illustrate the use of two pawls 30 pinned on opposite sides of the handle base 24 for additional strength and increased locking engagement of the locking handle and pawl assembly 16 in the RMC Bay 18, but a single pawl 30 pinned next to the side of the handle base 24 will work equally well in the operation of the locking handle and pawl assembly 16, when securing the RMC 10 inside the RMC Bay 18. For ease in the discussion of the locking handle and pawl assembly 16, the structure and function of a single pawl 30 is described, since the pawls 30 are identical.

In FIG. 2, an exploded perspective view of the RMC 10 is shown with a view of the locking handle and pawl assembly 16 positioned for being pinned between the inside surface of the RMC enclosure brackets 14. A top portion of the handle 22 has a protrusion or handle nose 27 used as a fulcrum during the ejection of the RMC from the RMC Bay 18.

Each of the pawls 30 shown in this drawing include a pawl cam surface 29 with the horizontal, flat spring catch 31 at one end of the pawl cam surface 29 and the vertical, pawl bay catch 33 at the opposite end of the pawl cam surface 29. The RMC front cover plate 32 has an upper flexible portion used as the flat spring 38, which bends approximately along dashed horizontal line 40 when acted upon by the handle cam surface 26 of the handle 22 during the first ten degrees of handle arm 28 rotation. The top of the flat spring 38 includes a pair of flat spring openings 42 for allowing the ingress of the flat spring catch 31 horizontal surface of the pawl 30, which provides the locking handle and pawl assembly 16 counterclockwise anti-rotational feature.

In this drawing, the RMC front cover plate 32 is shown positioned for being pinned, using enclosure pins 34, to the front of an RMC enclosure 12. Also the RMC enclosure 12 includes a flat spring stop pin 36, disposed above the enclosure pins 34. The flat spring stop pin 36 is used to protect the flat spring 38 portion of the front cover 32 on the RMC 10 from bending too far rearward along dashed horizontal line 40 which could permanently deform the flat spring 38 if the handle arm 28 is accidentally rotated clockwise due to an impact load on the front of the RMC 10.

The locking handle and pawl assembly 16 also includes a handle and pawl attachment pin 44 which is solidly connected to the lower portion of the pawl 30 and provides an axle that the handle 22 rotates on during the first ten degrees of handle arm motion. The handle and pawl attachment pin 44 is not attached to the RMC enclosure brackets 14.

Opposite ends of a pawl axle pin 46, connected to the enclosure brackets 14, act as an axle for the pawls 30 and the handle 22 to rotate on during the last thirty degrees of handle motion. The pawl axle pin 46 is received through a handle dwell slot 50, which allows a dwell in pawl rotation during the first ten degrees of the handle arm rotation. Also, the pawl axle pin 46 is received through a clearance hole in the handle base 24.

A handle motion restrictor pin 48, which interacts with the handle motion restrictor cutout 54 in the RMC enclosure brackets 14 is used to prevent unwanted, extra handle arm motion. The pawl axle pin 46 is received through an axle clearance hole in the pawl 30. The ends of the handle motion restrictor pin 48 ride inside the handle motion restrictor cutout 54 as the handle arm 28 is raised for releasing the pawl bay catch 33 from the bay catch opening 20 in the RMC Bay 18.

In the following discussion of FIGS. 3-7, the operation of the locking handle and pawl assembly 16 is illustrated using the handle and pawl attachment pin 44, the pawl axle pin 46, the handle motion restrictor pin 48, the handle dwell slot 50, the handle motion restrictor cutout 54 and the handle cam surface 26 for co-acting together for releasing the flat spring catch 31 from the flat spring 38 and releasing the pawl bay catch 33 from the side of the Bay catch opening 20, thereby allowing removal of the RMC 10 from the RMC Bay 18. Also, the RMC enclosure bracket 14 is shown in dashed lines, so that pin movements in the side of the pawl 30 and handle base 24 can be more clearly seen.

Figure 3:
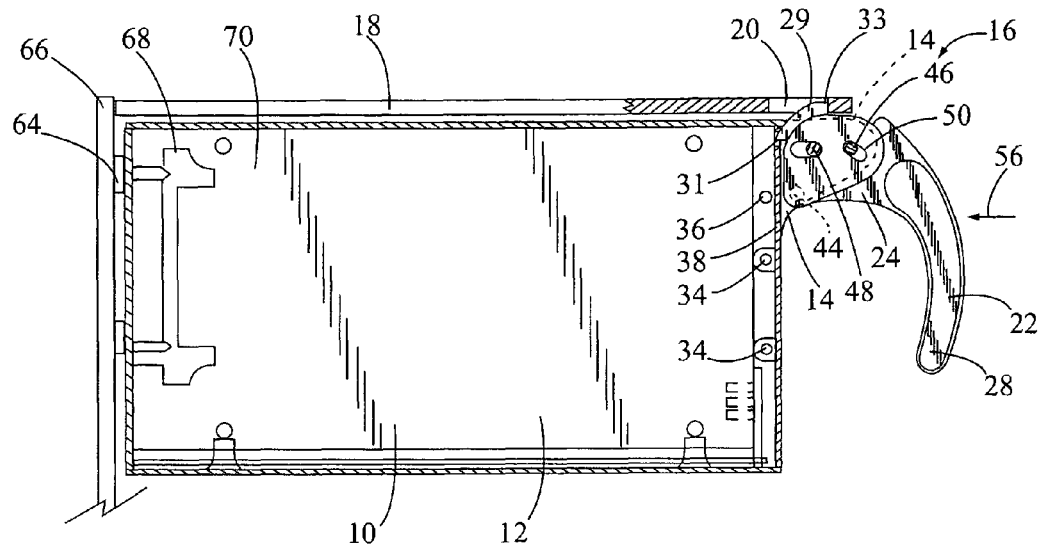
FIG. 3 illustrates a side sectional portion of the RMC Bay showing the RMC in a fully inserted and locked position with a pawl bay catch on a pawl cam surface of a pawl used for engaging a vertical side of a pawl bay catch opening located in the top of the RMC Bay.

In FIG. 3, a side sectional portion of the RMC Bay 18 is shown with the Pawl bay catch 33 engaging a vertical side of the bay catch opening 20 in the top of the RMC Bay 18. Also, a flat spring 38 includes the pair of flat spring openings 42 for allowing the ingress of a flat spring catch 31 horizontal surface of a pawl 30.

In this drawing, the RMC Bay 18 is shown including a female electrical connector 64, mounted on a printed circuit board 66, for releasable attachment to a male connector 68 attached to a hard disk drive 70 mounted inside the RMC enclosure 12.

When the RMC 10 is first inserted into an RMC Bay 18 it is pushed towards the female connector 64 on the printed circuit board 66. As the force required to mate the male connector 68 to the female connector 64 increases with deeper insertion, it overcomes the holding force of the flat spring 38 against the handle base 24 and the pawl 30 thereby allowing the handle arm 28 to rotate clockwise, or downwardly. As the handle arm 28 moves further clockwise the pawl bay catch 33 engages the vertical side of a bay catch opening 20. With additional downward rotation of the handle arm 28, this lever action provides a linear force in the direction required to mate the male connector 68 on the RMC 10 with the female connector 64 on the printed circuit board 66. The handle arm 28 of the locking handle and pawl assembly 16 is shown in the closed and locked position, as indicated by Arrow 56.

In FIG. 4, the handle arm 28 is shown rotated upwardly, as indicated by arrow 58, and counterclockwise ten degrees. With this movement of the handle arm 28, the pawl axle pin 46 attached to the RMC enclosure brackets 14 moves from the left side to the right side of the dandle dwell slot 50. +++(Doc, this movement corresponds with the drawings. Is this correct?)++++

At the same time, the handle cam surface 26 moves from right to left and engages the flat spring 38 portion of the RMC front cover plate 32 and releases the flat spring catch 31 from the bottom of the flat spring openings 42. Further and at the same time, the handle motion restrictor pin 48 slides from right to left in the top of the handle motion restrictor cutout 54 in the RMC enclosure brackets 14.

In FIGS. 5 and 6, the handle arm 28 is shown moved upwardly, counterclockwise, as indicated by arrows 60 and 62, twenty and thirty degrees rotating the pawl 30 counterclockwise ten and twenty degrees and lowering the pawl bay catch 33 inside the bay catch opening 20 in the RMC Bay 18. Further and at the same time, the handle motion restrictor pin 48 rotates from the top left position on the handle motion restrictor cutout 54 in an arc about pawl axle pin 46 fixed to the RMC enclosure brackets 14.

In FIG. 7, the handle arm 28 has been rotated upwardly, counterclockwise fully, as indicated by arrow 64, forty degrees rotating the pawl 30 counterclockwise and removing the pawl bay catch 33 on the pawl 30 from inside the bay catch opening 20 on the RMC Bay 18. The RMC 10 can now be removed from the RMC Bay 18. Further and at the same time, the handle motion restrictor pin 48 rotates along the edge of the handle motion restrictor cutout 54 in an arc about pawl axle pin 46 fixed to the RMC enclosure brackets 14 and abuts the flat surface of the handle motion restrictor cutout 54 which prohibits further unwanted, upward, counterclockwise motion of the handle arm 28. In addition during this last ten degrees of handle arm 28 motion, the handle nose 27 leverages against a surface on the front of the RMC Bay 18 creating a linear force that overcomes the holding force of the male connector 68 on the hard disk drive 70 from the male connector 64 on the printed circuit board 66 and ejects the RMC 10 from the RMC Bay 18, as indicated by arrow 67.

It should be noted, that when the RMC 10 with the locking handle and pawl assembly 16 is ready to be reinserted into the RMC Bay 18 for electrical connection, the RMC, as shown in this drawing, with the handle arm 28 raised, can now be placed back inside the RMC Bay 18 and the handle arm 28 lowered into a locked position, as shown in FIG. 3.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A locking handle and pawl assembly and a removable memory cartridge or RMC, the RMC adapted for releasable attachment inside a removable memory cartridge bay or RMC Bay, the assembly adapted for securing the RMC to the RMC Bay, the RMC Bay having a bay catch opening in the top thereof, the assembly and RMC comprising:
   a handle with handle base and handle arm extending outwardly therefrom, the handle base includes pin holes and a handle dwell slot;
   a first pawl pinned to one side of the handle base, the first pawl having a pawl cam surface with a pawl bay catch, the pawl bay catch adapted for receipt in the bay catch opening in the RMC Bay and securing the RMC inside the RMC Bay; and
   a pair of outwardly extending brackets on a RMC enclosure or housing, the handle base and first pawl pinned to the brackets;
   whereby when the handle arm is rotated upwardly, the pawl bay catch on the pawl cam surface of the first pawl is lowered and released from a side of a bay catch opening in the top of the RMC Bay, the handle arm can now be used to remove the RMC from the RMC Bay.

2. The assembly and RMC as described in claim 1 further including a second pawl, the second pawl pinned to an opposite side of the handle base, the second pawl having a pawl cam surface with bay catch thereon.

3. The assembly and RMC as described in claim 1 wherein the pawl cam surface of the first pawl also includes a flat spring catch for engaging a flat spring on the front of the RMC, the handle base having a handle cam surface for engaging and releasing the flat spring catch from the flat spring when the handle arm is raised.

4. The assembly and RMC as described in claim 3 wherein the handle dwell slot receives a pawl axle pin therethrough for movement of the pawl axle pin therein prior to the cam surface on the handle base engaging and releasing the flat spring catch from the flat spring, the pawl axle pin attached to the first pawl.

5. The assembly and RMC as described in claim 1 wherein the brackets include a handle motion restrictor cutout therein for guiding ends of a handle motion restrictor pin during the rotation of the handle arm, the handle motion restrictor pin mounted on the handle base and in a dwell slot in the first pawl.

6. The assembly and RMC as described in claim 1 wherein a top portion of the handle arm includes a handle nose, the handle nose used as a fulcrum for the ejection of the RMC from the RMC Bay.

7. A locking handle and pawl assembly and a removable memory cartridge or RMC, the RMC adapted for releasable attachment inside a removable memory cartridge bay or RMC Bay, the assembly adapted for securing the RMC to the RMC Bay, the RMC Bay having a bay catch opening in the top thereof, the assembly and RMC comprising: a handle with handle base and handle arm extending outwardly therefrom, the handle base includes pin holes, a handle dwell slot and a handle cam surface; a first pawl pinned to one side of the handle base, the first pawl having a pawl cam surface with pawl bay catch and a flat spring catch, the pawl bay catch adapted for receipt in the bay catch opening in the RMC Bay and securing the RMC inside the RMC Bay, the flat spring catch for engaging a flat spring on the front of the RMC, the handle base having a handle cam surface for engaging and releasing the flat spring catch from the flat spring when the handle arm is raised, when the handle base is raised further, the bay catch on the pawl cam surface is lowered and released from a side of the bay catch opening in the RMC Bay, the handle arm can now be used to remove the RMC from the RMC Bay; and a pair of outwardly extending brackets on a RMC enclosure or housing, the handle base and first pawl pinned to the brackets.

8. The assembly and RMC as described in claim 7 further including a second pawl, the second pawl pinned to an opposite side of the handle base, the second pawl having a cam surface with a pawl bay catch and flat spring catch, the first pawl identical to the first pawl.

9. The assembly and RMC as described in claim 7 wherein the handle dwell slot in the handle base receives a pawl axle pin therethrough for movement of the pawl axel pin therein prior to the handle cam surface on the handle base engaging and releasing the flat spring catch from the flat spring.

10. The assembly and RMC as described in claim 7 wherein the brackets include a handle motion restrictor cutout therein guiding ends of a handle restrictor pin during the rotation of the handle arm.

11. The assembly and RMC as described in claim 7 wherein the handle arm includes an outwardly extending handle nose extending upwardly therefrom, the handle nose used as a fulcrum used for engaging a portion of the RMC Bay during the ejection of the RMC from the RMC Bay.

12. A locking handle and pawl assembly adapted for mounting on a pair of outwardly extending brackets on a removable memory cartridge or RMC, the brackets having a handle motion restrictor cutout therein, the RMC adapted for releasable attachment inside a removable memory cartridge bay or RMC Bay, the assembly adapted for securing the RMC to the RMC Bay, the RMC Bay having a bay catch opening in the top thereof, the assembly comprising:

a handle with handle base and handle arm extending outwardly therefrom, the handle base includes pin holes and a handle dwell slot, the handle base adapted for pinning to the brackets; and a first pawl pinned to one side of the handle base, the first pawl having a pawl cam surface with pawl bay catch, the pawl bay catch adapted for receipt in the bay catch opening in the RMC Bay and securing the RMC inside the RMC Bay, the first pawl adapted for pinning to the brackets;

whereby when the handle arm is rotated upwardly, the pawl bay catch on the pawl cam surface of the first pawl is lowered and released from a side of a bay catch opening in the top of the RMC Bay, the handle arm can now be used to remove the RMC from the RMC Bay.

13. The assembly as described in claim 12 further including a second pawl, the second pawl pinned to an opposite side of the handle base, the second pawl having a pawl cam surface with bay catch thereon.

14. The assembly as described in claim 12 wherein the pawl cam surface of the first pawl also includes a flat spring catch for engaging a flat spring on the front of the RMC, the handle base having a handle cam surface for engaging and releasing the flat spring catch from the flat spring when the handle arm is raised.

15. The assembly as described in claim 12 wherein the handle dwell slot receives a pawl axle pin therethrough for movement of the pawl axle pin therein prior to the cam surface on the handle base engaging and releasing the flat spring catch from the flat spring.

16. The assembly as described in claim 12 further including a handle motion restrictor pin attached to the handle base and the first pawl, opposite ends of the handle motion restrictor pin are adapted for receipt in the handle motion restrictor cutout in the brackets.

17. The assembly as described in claim 12 wherein the handle arm includes an outwardly extending handle nose extending upwardly therefrom, the handle nose used as a fulcrum used for engaging a portion of the RMC Bay during the ejection of the RMC from the RMC Bay.

* * * * *